United States Patent
Hua et al.

(10) Patent No.: US 8,415,426 B1
(45) Date of Patent: Apr. 9, 2013

(54) TIRE WITH RUBBER COMPONENT CONTAINING COMBINATION OF CARBON BLACK, SILICA AND FUNCTIONALIZED MINERAL

(75) Inventors: Kuo-Chih Hua, Richfield, OH (US); Ling Du, Fairlawn, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 43 days.

(21) Appl. No.: 13/331,275

(22) Filed: Dec. 20, 2011

(51) Int. Cl.
- *C08J 5/14* (2006.01)
- *C08K 9/00* (2006.01)
- *C08K 3/30* (2006.01)
- *B60C 11/00* (2006.01)
- *C08L 9/00* (2006.01)

(52) U.S. Cl.
USPC ............. 524/571; 524/81; 524/284; 524/418; 523/152; 523/209; 523/213; 525/324; 525/331.9; 525/342; 152/209.1; 152/209.5

(58) Field of Classification Search .................. 524/492, 524/493, 571, 81, 261–262, 271, 284, 418; 523/331.9, 152, 155, 209, 214, 313; 525/342, 525/324, 331.9; 152/209.1, 209.5
See application file for complete search history.

(56) References Cited

U.S. PATENT DOCUMENTS

| | | | |
|---|---|---|---|
| 6,936,669 B2 | 8/2005 | Halasa et al. ................. 526/260 |
| 7,718,717 B2 * | 5/2010 | Lapra et al. ................... 523/216 |
| 7,789,117 B2 * | 9/2010 | Puhala et al. .............. 152/209.5 |
| 7,981,966 B2 | 7/2011 | Kobayashi et al. ........... 525/237 |
| 2004/0051210 A1 * | 3/2004 | Tardivat et al. ............... 264/349 |
| 2006/0084730 A1 * | 4/2006 | Fukushima et al. ............ 524/90 |
| 2006/0247360 A1 * | 11/2006 | Halasa et al. ................. 524/493 |
| 2007/0074455 A1 * | 4/2007 | Welygan et al. ................ 51/297 |
| 2007/0175557 A1 * | 8/2007 | Puhala et al. .............. 152/209.5 |
| 2008/0287601 A1 | 11/2008 | Thiele et al. .................. 524/588 |
| 2009/0151830 A1 * | 6/2009 | Sandstrom et al. ........ 152/209.1 |
| 2010/0190885 A1 * | 7/2010 | Hua et al. ...................... 523/152 |
| 2011/0190416 A1 * | 8/2011 | Maesaka et al. .............. 523/155 |

OTHER PUBLICATIONS

Machine Translation of JP 07-211134.*

* cited by examiner

*Primary Examiner* — Hannah Pak
(74) *Attorney, Agent, or Firm* — Henry C. Young, Jr.

(57) ABSTRACT

A tire is provided having a component comprised of a rubber composition containing at least one conjugated diene-based elastomer and a combination of rubber reinforcing fillers composed of rubber reinforcing carbon black, precipitated silica and granular functionalized mineral comprised of at least one of aluminum hydrate (ALOOH) and titanium dioxide. The granular mineral is functionalized by pretreatment with a coupling agent. The granular mineral fillers are pretreated with a coupling agent to promote a combination of rubber reinforcing effect for the mineral fillers and to promote a hydrophobation of the mineral fillers to promote their dispersability in the rubber composition.

12 Claims, No Drawings

TIRE WITH RUBBER COMPONENT CONTAINING COMBINATION OF CARBON BLACK, SILICA AND FUNCTIONALIZED MINERAL

FIELD OF THE INVENTION

A tire is provided having a component comprised of a rubber composition containing at least one conjugated diene-based elastomer and a combination of rubber reinforcing fillers composed of rubber reinforcing carbon black, and granular functionalized mineral filler comprised of at least one of aluminum hydrate (AlOOH and titanium dioxide. The rubber composition may also contain precipitated silica. The granular mineral filler is functionalized by pretreatment with a coupling agent. The granular mineral fillers are pretreated with a coupling agent to promote a combination of rubber reinforcing effect for the mineral fillers, to promote a hydrophobation of the mineral fillers to promote their dispersability in the rubber composition and to promote an improvement in rubber/filler interactions.

BACKGROUND OF THE INVENTION

Rubber compositions typically contain particulate filler reinforcement to promote enhancement of physical properties of the rubber composition.

Conventional filler reinforcement used for rubber compositions is typically at least one of rubber reinforcing carbon black and silica such as, for example, precipitated silica, including combinations of rubber reinforcing carbon black and the silica.

Tires conventionally have at least one component comprised of such filler reinforced rubber composition.

For this invention, a reinforcing filler combination is proposed which is comprised of what is believed to be a synergistically effective combination of rubber reinforcing carbon black, optionally precipitated silica and granular functionalized mineral (coupling agent pretreated mineral), where said mineral is comprised of at least one of aluminum hydrate (AlOOH) and titanium dioxide ($TiO_2$), preferably aluminum hydrate, as rubber reinforcing fillers to promote a beneficial viscoelastic response for the rubber composition.

Such pretreated minerals are provided in a granular form in contrast to a rod configured form. Such pretreated nanoparticle granular minerals are provided exclusive of composites of such minerals and silica.

It is envisioned that such combination of reinforcing fillers can provide a viscoelastic response for a rubber composition which contains conjungated diene-based elastomer(s) which differs from using reinforcing fillers limited to a combination of rubber reinforcing carbon black and precipitated silica.

It is preferred that the granular pretreated mineral fillers are of a nanoparticle size having an average diameter in a range of from about 10 to about 500, alternately from about 10 to about 300 nanometers (nm).

The aluminum hydrate (AlOOH) is of unique interest for achieving a relatively high rubber reinforcement effect and special rubber/filler interactions to promote vehicular tire rolling resistance reductions and increased wet traction performance for a tire having a tread containing a pre-treated aluminum hydrate.

Coupling agents used for pre-treating the granular mineral fillers prior to their addition to the rubber composition have a moiety reactive with said granular AlOOH and $TiO_2$ mineral fillers, particularly the granular AlOOH, and another different moiety interactive with diene-based elastomer(s) of said rubber composition.

Representative of such coupling agents include, for example, polysulfide based coupling agents which contain end functional groups which can chemically react with the AlOOH and $TiO_2$ mineral fillers, particularly the granular AlOOH filler, such as, for example, carboxyl and siloxy groups, particularly carboxyl groups.

Historically, it has heretofore been suggested to use various aluminum oxides and hydroxides for rubber reinforcement which have been pretreated with a coupling agent where a rod form of aluminum hydrate (AlOOH) has been exemplified without exceptional results. For example, see U.S. Pat. No. 7,718,717.

However, for this invention, it has surprisingly been discovered that a granular from of aluminum hydrate (AlOOH) pretreated with a coupling agent provided an unexpectedly beneficial viscoelastic response in a sense of appearing to provide a synergistic result of combining the pretreated AlOOH with a combination of rubber reinforcing carbon black and precipitated silica to achieve an unexpectedly high rubber reinforcing effect together with a beneficially low hysteresis effect for the rubber composition and predictive improved wet performance for a tire with a tread of such rubber composition.

By the term viscoelastic response it is contemplated that viscoelastic behavior is to be effected by an inclusion of the aforesaid granular from of aluminum hydrate (AlOOH) in a sense of promoting beneficial physical properties for a rubber composition.

It was unexpectedly discovered that the combined inclusion of the pretreated, functionalized, granular aluminum hydrate (AlOOH), instead of the rod form of AlOOH, with a combination of rubber reinforcing carbon black and precipitated silica can be beneficially used to promote a reduction in rubber hysteresis as evidenced desirable tan delta measurements with predictive beneficial reduction in rolling resistance for an associated rubber tire having a tread of such rubber composition.

Data reported in the literature (Hiroshi Mouri, et al, *Rubber Chemistry and Technology*, 72 (1999), Pages 960 through 968) reported that aluminum trihydrate, namely $Al(OH)_3$, exhibited different dynamic viscoelastic response to frequency sweep measurement for a plot of loss modulus (G") versus a very high frequency at which was greater than the loss modulus (G") for both silica and carbon black.

The very high frequency tan delta measurements for the rubber compositions are referred to as a result of a very high tan delta test frequency of $10^5$ Hertz, at a temperature of about 23° C. and dynamic strain of about one (1) percent.

It is envisioned that such high frequency tan delta value is a predictive indication of the rubber composition's beneficial promotion of wet traction for a vehicular tire tread when containing the aluminum trihydrate Such data referred to in that literature also reported low frequency tan delta values for the rubber compositions at a lower frequency of 10 Hertz at a temperature of about 23° C. and dynamic strain of about 1 percent.

It is envisioned that such low frequency tan delta test value is a predictive indication of the rubber composition's promotion of reduced hysteresis for the rubber composition when containing the aluminum trihydrate with predictive beneficial reduction in rolling resistance for a tire with tread of such rubber composition.

In the description of this invention, the term "phr" where used herein, and according to conventional practice, refers to "parts of a respective material per 100 parts by weight of rubber, or elastomer".

In the description of this invention, the terms "rubber" and "elastomer" where used herein, are to be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art. The terms vulcanize and cure where used therein are used interchangeably unless otherwise indicated.

SUMMARY AND PRACTICE OF THE INVENTION

In accordance with this invention, a rubber composition is provided which is comprised of, based on parts by weight per 100 parts by weight rubber (phr);
(A) at least one conjugated diene-based elastomer, and
(B) about 30 to about 120 phr of reinforcing filler, wherein said reinforcing filler is comprised of:
  (1) about 1 to about 50, alternately from about 10 to about 40, phr of granular functionalized mineral wherein said functionalized granular mineral is comprised of a coupling agent pre-treated granular mineral comprised of at least one of aluminum hydrate (AlOOH) and titanium dioxide ($TIO_2$), particularly AlOOH,
  (2) about 1 to about 110, alternately from about 40 to about 100, phr of synthetic amorphous silica (e.g. precipitated silica), and
  (3) about 1 to about 90, alternately from about 1 to about 70, phr of rubber reinforcing carbon black.

In one embodiment, said granular mineral, particularly the AlOOH, is exclusive of such mineral, configured in rod form.

In one embodiment, said coupling agent for pretreatment of said granular mineral, particularly the AlOOH, is comprised of a compound selected from tetrathiodipropionic acid and compounds represented by a general structural formula (I):

$$X\text{-}M\text{-}Y \qquad (I)$$

where X is a polysulfide moiety containing an average of from about 2 to about 4 connecting sulfur atoms in its polysulfide bridge or a mercapto moiety, Y is a moiety reactive with the mineral filler (e.g. granular AlOOH) comprised of carboxyl groups (—COOH) groups or siloxy groups (—OR) where R is an aliphatic hydrocarbon radical having from 3 to 18, preferably 3, carbon atoms and M is a non-elastomeric hydrocarbon bridge between X and Y comprised of, for example, an aliphatic hydrocarbon having from about 2 to about 18 carbon atoms.

In one embodiment, said granular mineral filler is pre-treated with a polysulfidic coupling agent with an end carboxylic group (—COOH) reactive with the said mineral filler.

In one embodiment, said rubber composition further contains a coupling agent comprised of a bis(3-triethoxysilylpropyl) polysulfide having an average of from about 2 to about 4 connecting sulfur atoms in its polysulfidic bridge.

Further exemplary of the above coupling agents may be comprised of, for example, bis-(3-trialkoxysilylalkyl) polysulfides which contain an average of from 2 to about 4 connecting sulfur atoms in its polysulfidic bridge, with an average of from about 3.2 to about 3.8 or an average of from about 2 to about 2.6 connecting sulfur atoms in its polysulfidic bridge, and as, for example, a coupling agent comprised of an organoalkoxymercaptosilane. Alkyl groups for the alkoxy groups desirably include ethyl groups and the alkyl group for said silylalkyl moiety may be selected from, for example, ethyl, propyl and butyl radicals, particularly propyl groups.

Accordingly, in one embodiment such bis-(3-trialkoxysilylalkyl) polysulfide coupling agent may, for example, be comprised of a bis-(3-triethoxysilylpropyl) polysulfide.

In one embodiment, as hereinbefore mentioned, said coupling agent treated granular mineral has an average diameter in a range of from about 20 to about 500, alternately from about 20 to about 300, or even from about 20 to about 150, nanometers (nm).

A significant aspect of the invention providing said granular mineral as a coupling agent functionalized aluminum hydrate (AlOOH) in its granular form is that it has been observed to provide much lower hysteresis for the rubber composition with a similar reinforcement physical properties as compared to carbon black reinforced or precipitated silica reinforced rubber composition since, in contrast, hysteresis values have been observed to increase with an increase in reinforcement physical properties as compared to using only rubber reinforcing carbon black or precipitated silica.

While the mechanism is not understood, this is considered herein to be significant in a sense of the aforesaid difference in rubber reinforcement quality particularly as compared to using only carbon black or precipitated silica reinforcement.

It is to be appreciated that said diene-based elastomer for this invention may be selected from homopolymers and copolymers of dienes such as for, example, isoprene and 1,3 butadiene and copolymers of styrene with at least one diene selected from isoprene and 1,3-butadiene.

Representative of such elastomers are, for example, styrene/butadiene copolymers whether prepared by emulsion of organic solution polymerization, c is 1,4-polybutadiene, c is 1,4-polyisoprene whether natural or synthetic as well as minor amounts of elastomers such for example and if desired, trans 1,4-polybutadiene, isoprene/butadiene copolymers, styrene/isoprene copolymers, high vinyl polybutadiene having a vinyl content in a range of about 30 to about 90 percent and styrene/isoprene/butadiene terpolymers.

Further representative of such elastomers are, for example, at least one functionalized diene-based elastomer comprised of at least one of functionalized cis 1,4-polyisoprene elastomer (functionalized IR), functionalized cis 1,4-polybutadiene elastomer (functionalized BR) and functionalized styrene/butadiene copolymer elastomer (functionalized SBR), or a combination of said functionalized elastomers and said non-functionalized elastomers.

In one embodiment, said functionalized diene-based elastomer contains functional group(s) comprised of:
  (A) amine functional group reactive with hydroxyl groups on said precipitated silica, or
  (B) siloxy functional group reactive with hydroxyl groups on said precipitated silica, or
  (C) combination of amine and siloxy functional groups reactive with hydroxyl groups on said precipitated silica, or
  (D) combination of thiol and siloxy functional groups reactive with hydroxyl groups on said precipitated silica (e.g. U.S. Patent Publication No. 2008/0287601), or
  (E) combination of imine and siloxy functional groups reactive with hydroxyl groups on said precipitated silica, or
  (F) hydroxyl functional groups reactive with said precipitated silica, or
  (G) epoxy groups reactive with hydroxyl groups on said precipitated silica, or (H) carboxyl groups reactive with hydroxyl groups on said precipitated silica.

For the functionalized elastomers, representative of amine functionalized SBR elastomers are, for example, in-chain functionalized SBR elastomers mentioned in U.S. Pat. No. 6,936,669.

Representative of a combination of amino-siloxy functionalized SBR elastomers with one or more amino-siloxy groups connected to the elastomer is, for example, HPR355™ from JSR and amino-siloxy functionalized SBR elastomers mentioned in U.S. Pat. No. 7,981,966.

Styrene/butadiene elastomers end functionalized with a silane-sulfide group are mentioned in U.S. Patent Publication No. 2008/0287601.

Taken from the patent literature, it is envisioned that a styrene/butadiene elastomer may be functionalized with a combination of alkoxysilane and at least one of primary amine and thiol groups, particularly thiol groups, and therefore contains functionalization comprised of alkoxy and at least one of amine and thiol groups, particularly thiol groups, which may be, for example, CE92M™ from Stryron.

Representative of hydroxy functionalized SBR elastomers is, for example, Tufdene 3330™ from Asahi.

Representative of epoxy functionalized SBR elastomers is, for example, Tufdene E50™ from Asahi.

The rubber composition itself can also be provided as being a sulfur cured composition through vulcanization of the uncured rubber composition (e.g. tread) tread as a component of a tire in a manner well known to those having skill in such art, usually by curing under conditions of elevated temperature and pressure in a suitable mold for a suitable period of time.

The curatives for sulfur curing the rubber composition are curatives conventionally used for sulfur curable elastomers which typically include an addition of free sulfur and one or more appropriate cure accelerators and sometimes also a retarder. Such curatives and use thereof for sulfur curable elastomer compositions are well known to those skilled in the art.

Sequential mixing processes for preparing sulfur curable rubber compositions in which elastomers and associated ingredients exclusive of addition of free sulfur and sulfur vulcanized accelerator are first mixed in one or more sequential steps, usually called a "non-productive mixing step(s)" followed by a final mixing step for adding curatives, usually called a "productive mixing step", are also well known to those skilled in the art.

It is to be appreciated that the coupling agent, if in a liquid form, might be used in conjunction with a carbon black carrier, namely, pre-mixed with a carbon black prior to the addition to the rubber composition, and such carbon black is usually to be included in the amount of carbon black accounted for in the rubber composition formulation.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

In the preparation of the rubber composition typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), Pages 344 through 346. Typical amounts of antiozonants comprise about 1 to 5 phr.

Typical amounts of fatty acids which can comprise, for example, stearic acid, palmitic acid, oleic acid and their mixtures can comprise about 0.5 to about 5 phr.

Typical amounts of zinc oxide can comprise, for example, about 1 to about 5 phr. Typical amounts of waxes, if used, may comprise, for example, about 1 to about 5 phr. Often microcrystalline waxes are used. Typical amounts of peptizers, if used, may comprise, for example, about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents might be used, for example, in an amount ranging from about 0.5 to about 4 phr, or even, in some circumstances, up to about 8 phr, with a range of from about 1 to about 2.5, sometimes from about 1 to about 2, being preferred.

Accelerators are used to control the time and/or temperature required for vulcanization and to improve the properties of the vulcanizate. In one embodiment, a single accelerator system may be used, i.e., primary accelerator. Conventionally a primary accelerator(s) might be used, for example, in total amounts ranging from about 0.5 to about 4, preferably about 0.8 to about 2, phr. In another embodiment, combinations of a primary and a secondary accelerator might be used with the secondary accelerator being used, for example, in amounts of about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. The primary accelerator is typically a sulfenamide. If a second accelerator is used, the secondary accelerator is usually a guanidine, dithiocarbamate or thiuram compound.

The presence and relative amounts of the above ingredients are not considered to be the primary subject of this invention, except where otherwise noted, which is more primarily directed preparation of rubber composition by an inclusion of the aforesaid reinforcing filler to include the treated granular aluminum hydrate (AlOOH) or titanium dioxide, particularly the aluminum hydrate, together with rubber reinforcing carbon black and precipitated silica reinforcing fillers.

The ingredients are typically mixed in at least two stages, namely, at least one non-productive stage followed by a productive mix stage. The curatives (e.g. addition of free sulfur) are typically mixed in the final stage which is conventionally called the "productive" mix stage in which the mixing typically occurs at a temperature, or ultimate temperature, lower than the mix temperature(s) than the preceding non-productive mix stage(s). The rubber, carbon black and coupling agent if used, are mixed in one or more non-productive mix stages. The terms "non-productive" and "productive" mix stages are well known to those having skill in the rubber mixing art.

As hereinbefore discussed, in at least one of the non-productive mixing stages, the materials are thermomechanically mixed and the mixing temperature is allowed to reach a temperature of, for example, between about 120° C. and about 190° C., usually from about 140° C. to about 180° C. with the extended mixing being applied for the silica treated carbon black for the practice of this invention.

It is contemplated that the rubber composition containing the combination of functionalized mineral, rubber reinforcing carbon black and precipitated silica reinforcing filler may be used, for example, tire components, such as, for example, tire treads, sidewalls, and chafer components, particularly tire treads where lower hysteresis of the rubber composition is often sought together with an increase in one or more rubber physical properties. Such tires can be built, shaped, molded and cured by various methods which are known and will be readily apparent to those having skill in such art.

The following Example is provided to further illustrate the invention. Parts and percentages are by weight unless otherwise indicated.

EXAMPLE I

Rubber samples (compositions) were prepared to evaluate use of granular aluminum hydrate ((AlOOH) for use as rubber composition reinforcement.

Rubber Samples A and B were prepared for such purpose as illustrated in Table 2.

The basic rubber composition is illustrated in Table 1 where parts and percentages are by weight unless otherwise indicated.

TABLE 1

| Material | Parts (phr) |
|---|---|
| Non-productive mixing (NP-1) | |
| Functionalized styrene/butadiene rubber[1] | 70 |
| Cis 1,4-polybutadiene rubber[2] | 30 |
| Precipitated silica[3] | 65, 45, 47, 0 |
| Rubber reinforcing carbon black (N100) | 69, 45, 10, 0 |
| Aluminum hydrate (AlOOH) granular particles, untreated[4] | 20, 25, 0 |
| Aluminum hydrate (AlOOH), rod form[4a] | 20, 25, 0 |
| Pretreated AlOOH granular particles with coupling agent A1[5] | 0, 25 |
| Pretreated AlOOH granular particles with coupling agent A2[6] | 0, 20 |
| Wetting agent[7] | 0, 15 |
| Coupling Agent C[8] | 0 and 15 |
| Zinc oxide | 3.5 |
| Fatty acid[9] | 2 |

TABLE 1-continued

| Material | Parts (phr) |
|---|---|
| Non-productive mixing (NP-2) | |
| Remilling (remixing), no ingredients added | |
| Productive mixing (PR) | |
| Sulfur | 1.7 |
| Accelerators[10] | 1.6 |
| Antidegradant | 0.8 |

[1]Functionalized styrene/butadiene rubber, namely styrene/butadiene rubber understood from literature to be functionalized with functional groups comprised of alkoxysilane and thiol groups as, for example, CE92M ™ from Styron
[2]Cis 1,4-polybutadiene rubber as CB25 ™ from Lanxess
[3]Precipitated silica as Zeosil ™ 1165 from Rhodia
[4]Aluminum hydrate (AlOOH) granular particles, having an average particle size of about 100 to about 300 nm
[4a]Aluminum hydrate (AlOOH) in rod form, untreated, understood to have an average diameter (D) in a range of from about 1 to about 20 nm (namometers), an average length (L) in a range of from about 10 to about 200 nm and an average aspect ratio (L/D in a range of from about 10 to about 100.
[5]Aluminum hydrate (AlOOH) granular particles, pretreated with Coupling Agent (A) in organic solution as a polysulfidic coupling agent with end carboxylic functional group (—COOH) reactive with the AlOOH
[6]Aluminum hydrate (AlOOH) granular particles, treated with Coupling Agent (A) except that that the granular particles were pretreated by dry mixing procedure.
[7]Wetting agent to promote hydrophobation of the AlOOH as a polyolefin from Lubrizol
[8]Coupling agent C as a bis(3-triethoxysilylpropyl) polysulfide having an average of from about 2 to about 2.6 connecting sulfur atoms in its sulfidic bridge as Si266 ™ from Evonic
[9]Fatty acid comprised primarily of stearic, palmitic and oleic acids
[10]Sulfur cure accelerators as a sulfenamide and diphenylguanidine

TABLE 2

| | Rubber Samples (phr) | |
|---|---|---|
| | Carbon Black Control A | Carbon Black and AlOOH B |
| Material | | |
| Rubber reinforcing carbon black (N100) | 65 | 45 |
| Aluminum hydrate (AlOOH), granular, untreated | 0 | 20 |
| Coupling Agent C (the bis(3-triethoxysylylpropyl) polysulfide) | 0 | 3 |
| Properties | | |
| RPA[1] | | |
| Uncured G', 0.83 Hz, 100° C., 15% strain (MPa) | 0.13 | 0.15 |
| Cured G', 11 Hz, 100° C., 1% strain (MPa) | 2.89 | 1.74 |
| Cured G', 11 Hz, 100° C., 10% strain (MPa) | 1.68 | 1.25 |
| Tan delta, 11 Hertz, (100° C.) | 0.148 | 0.11 |
| ATS[2], stress-strain | | |
| Tensile strength (MPa) | 16.1 | 12.1 |
| Elongation at break (%) | 381 | 371 |
| 300% modulus, ring, (MPa) | 13.2 | 10.3 |
| Rebound value (Zwick) | | |
| 23° C. | 40 | 51 |
| 100° C. | 57 | 66 |
| 0° C. | | 23.9 |
| 25.8 | | |

[1]Rubber Process Analyzer instrument
[2]Automated Testing System instrument, Instron Corporation From Table 2 it can be seen that when using 20 phr of the granular aluminum hydride (AlOOH), together with Coupling Agent C, to replace (partially) 20 phr of the rubber reinforcing carbon black, the processabilities of the uncured rubber compositions were similar as observed by the uncured G' values of 0.13 and 0.15 for rubber Samples A and B, respectively.

However, rebound values for the cured rubber compositions (A) and (B) at both 23° C. and 100° C. were significantly and beneficially improved by an extent of 28 percent and 16 percent respectively. This is an indication of significantly reduced hysteresis of the rubber composition with a predictive reduced (improved) internal heat build up and reduced (improved) rolling resistance for a vehicular tire with a tread of such rubber composition during the service of the tire.

EXAMPLE II

Rubber samples (compositions) C, D E, and H through J and were prepared to evaluate use of aluminum hydrate, (AlOOH), particularly pretreated, functionalized, aluminum hydrate (AlOOH), together with a combination of precipitated silica and rubber reinforcing carbon black.

Also, for rubber samples F and G, the effect of alternatively using aluminum hydrate (AlOOH) in rod form, both untreated and functionalized, respectively, together with precipitated silica and rubber reinforcing carbon black reinforcement (Experimental rubber Samples).

Rubber Samples C through J were prepared for such purpose in the manner of Example I using the formulation taken from Table 1 of Example I.

The following Table 3 presents various physical properties for the rubber Samples.

Control rubber Sample C used a combination of precipitated silica and rubber reinforcing carbon black without aluminum hydrate (AlOOH) for its filler reinforcement.

Experimental rubber Sample D added 25 phr of untreated aluminum hydrate (AlOOH) to replace 20 phr of the silica of rubber Sample C.

Experimental rubber Sample E added 25 phr of aluminum hydrate (AlOOH) pretreated and functionalized in organic solution with Coupling Agent A, namely a polysulfidic coupling agent with end carboxylic functional group (—COOH) reactive with the aluminum hydrate (AlOOH).

Experimental rubber Sample F added 25 phr of aluminum hydrate (AlOOH) pretreated and functionalized by dry mixing with Coupling Agent A.

Experimental rubber Samples G and H added 25 phr of rod form aluminum hydrate (AlOOH) untreated (Sample G) and pretreated with Coupling Agent A, namely the polysulfidic coupling agent with end carboxylic functional group (—COOH)

Rubber Sample I was similar to Control rubber Sample C and a combination of precipitated silica and rubber reinforcing carbon black without aluminum hydrate (AlOOH) for its filler reinforcement, although at a reduced level of the reinforcing fillers.

Experimental rubber Sample J was similar to rubber Sample E except than 20 phr instead of 25 phr of the pretreated aluminum hydrate (AlOOH) was used.

All of the rubber Samples contained a coupling agent identified as Coupling Agent C comprised of bis(3-triethoxysilypropyl) polysulfide containing an average of from about 2 to about 2.6 connecting sulfur atoms in its polysulfidic bridge as Si266™ from Evonic.

The following Table 3 presents various physical properties for Experimental rubber Samples C through J.

TABLE 3

|  | Control | Experimental Samples | | | | | | |
|---|---|---|---|---|---|---|---|---|
|  | C | D | E | F | G | H | I | J |
| Material | | | | | | | | |
| Precipitated silica | 65 | 45 | 45 | 45 | 45 | 45 | 47 | 47 |
| Rubber reinforcing carbon black | 5.2 | 5.2 | 5.2 | 5.2 | 5.2 | 5.2 | 5.2 | 5.2 |
| Aluminum hydrate (AlOOH), granular, untreated | 0 | 25 | 0 | 0 | 0 | 0 | 0 | 0 |
| Aluminum hydrate, granular, treated with Coupling Agent A | 0 | 0 | 25 | 0 | 0 | 0 | 0 | 20 |
| Aluminum hydrate, granular, treated with Coupling Agent B | 0 | 0 | 0 | 25 | 0 | 0 | 0 | 0 |
| Aluminum hydrate, Rod Form, untreated | 0 | 0 | 0 | 0 | 25 | 0 | 0 | 0 |
| Aluminum hydrate, Rod Form, treated with Coupling Agent A | 0 | 0 | 0 | 0 | 0 | 25 | 0 | 0 |
| Coupling Agent C | 5.2 | 7.35 | 3.6 | 3.6 | 7.35 | 3.6 | 5.76 | 5.76 |
| Properties | | | | | | | | |
| RPA[1] | | | | | | | | |
| Uncured G', 0.83 Hz, 100° C., 15% strain (MPa) | 0.24 | 0.15 | 0.17 | 0.17 | 0.23 | 0.22 | 0.18 | 0.17 |
| Cured G', 11 Hz, 100° C., 1% strain (MPa) | 2.49 | 1.91 | 2.39 | 2.09 | 2.2 | 3.05 | 1.84 | 1.77 |
| Cured G', 11 Hz, 100° C., 10% strain (MPa) | 1.73 | 1.5 | 1.71 | 1.59 | 1.58 | 1.8 | 1.46 | 1.37 |
| Tan delta, 11 Hertz, (100° C.) | 0.113 | 0.081 | 0.108 | 0.097 | 0.127 | 0.146 | 0.094 | 0.109 |
| ATS[2], stress-strain | | | | | | | | |
| Tensile strength (MPa) | 13.4 | 11.8 | 12.4 | 11.2 | 11.9 | 14.3 | 12.5 | 10.7 |
| Elongation at break (%) | 380 | 377 | 345 | 359 | 476 | 424 | 384 | 379 |
| 300% modulus, ring, (MPa) | 10.9 | 9.7 | 11.7 | 10 | 7.3 | 10.2 | 10.1 | 8.7 |
| Rebound value(Zwick) | | | | | | | | |
| 23° C. | 51 | 54 | 56 | 58 | 49 | 48 | 55 | 54 |
| 100° C. | 65 | 70 | 70 | 70 | 63 | 61 | 69 | 67 |
| 0° C. | 26.7 | 29.4 | 30.4 | 32.1 | 27.2 | 26.6 | 29.5 | 31.3 |

[1]Rubber Process Analyzer instrument
[2]Automated Testing System instrument, Instron Corporation From Table 3 it can be seen that rubber Sample E, with reinforcement as the combination of precipitated silica, rubber reinforcing carbon black and functionalized aluminum hydrate (AlOOH), gave the best performance of the rubber Samples in the sense of its of 300 percent modulus of 11.7 MPa, storage modulus (G') (1 percent strain) of 2.39 MPa and (10 percent strain) of 1.7 Mpa and rebound values of 0° C. as 30.4, 23° C. as 56 and 100° C. as 70, all of which are significantly higher than the respective physical property values for Control rubber Sample C.

For rubber Sample E, the aluminum hydrate (AlOOH) was pretreated (functionalized) with Coupling Agent A as a polysulfidic coupling agent with end carboxylic functional group (—COOH) reactive with the aluminum hydrate (AlOOH).

It is concluded that such properties are predictive of reduced hysteresis for the rubber compound (e.g. the rebound property) leading to beneficially reduced internal heat build up in a rubber composition such as a tire tread during service and accompanying reduced (improved) rolling resistance for a vehicular tire with such a tread without sacrificing stiffness (e.g. 300 percent modulus, and both 1 percent and 10 percent storage modulii (G') for the rubber composition.

This is considered to be particularly significant because is it is recognized that it is difficult to achieve a combination of significant improvements in all of such physical properties for a rubber composition, particularly the aforesaid combination of hysteresis and stiffness property aspects, and particularly for use in a tire tread.

For the use of rod forms of the aluminum hydrate (AlOOH), rubber Samples G and H are presented in an untreated form (Sample G) and a pretreated form with Coupling Agent A (Sample H) for the rubber composition also containing a combination of precipitated silica and rubber reinforcing carbon black reinforcing fillers.

It can be seen from Table 3 that the rod form of the untreated aluminum hydrate can contribute a reinforcing effect for the rubber composition, especially when pretreated with Coupling Agent A It can be seen that rubber Sample G presented a similar low strain stiffness (in the sense of tire handling property) as compared to silica-containing Control Sample C. However its 300 percent modulus is much lower and, indeed, is lowest of all of the other rubber Samples which is concluded to mean that there is poorer filler/polymer interaction between the untreated rod form of aluminum hydrate.

For rubber Sample H, with the pretreated rod form of aluminum hydrate with Coupling Agent A, the Storage Modulus (G') (1 percent strain) value was much higher than the silica-containing Control rubber Sample C and all of the other rubber Samples. However, while the pretreatment of the rod form of the aluminum hydrate with coupling agent A had an improved 300 percent modulus than the untreated aluminum hydrate (rubber Sample G) but still lower than the silica Control rubber Sample C.

Therefore it is concluded that the rod crystal form of the aluminum hydrate is much more, and undesirably, hysteretic for use in the tire application than its orthorhombic dipyramidal crystal form of the granular aluminum hydrate.

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition which is comprised of, based on the parts by weight per 100 parts by weight rubber (phr);
    (A) at least one conjugated diene-based elastomer, and
    (B) about 30 to about 120 phr of reinforcing filler, wherein said reinforcing filler is comprised of:
        (1) about 1 to about 50 phr of granular functionalized mineral filler wherein said functionalized granular mineral filler is comprised of a coupling agent pretreated granular mineral consisting of aluminum hydrate,
        (2) zero to about 100 phr of precipitated silica, and
        (3) about 1 to about 90 phr of rubber reinforcing carbon black,
    wherein said granular aluminum hydrate is pretreated with the coupling agent comprised of a compound represented by a general structural formula (I):

$$X\text{-}M\text{-}Y \qquad (I)$$

where X is a polysulfide moiety containing an average of from about 2 to about 4 connecting sulfur atoms in its polysulfide bridge or mercapto moiety, Y is a moiety reactive with the granular aluminum hydrate and with hydroxyl groups on said precipitated silica comprised of carboxyl groups (—COOH) and M is a non-elastomeric hydrocarbon bridge between X and Y comprised of an aliphatic hydrocarbon having from about 2 to about 18 carbon atoms, and wherein at least one of said diene-based elastomers is a functionalized diene-based elastomer comprised of at least one of functionalized cis 1,4-polyisoprene elastomer, functionalized cis 1,4-polybutadiene elastomer and functionalized styrene/butadiene copolymer elastomer, wherein said functionalized diene-based elastomer contains functional group(s) comprised of:

(C) amine functional group reactive with said granular aluminum hydrate, or (D) siloxy functional group reactive with said granular aluminum hydrate, or (E) combination of amine and siloxy functional groups reactive with said granular aluminum hydrate, or (F) combination of thiol and siloxy functional groups reactive with said granular aluminum hydrate, or (G) combination of imine and siloxy functional groups reactive with said granular aluminum hydrate, or (H) hydroxyl functional groups reactive with said granular aluminum hydrate, or (I) epoxy groups reactive with said granular aluminum hydrate, or (J) carboxyl groups reactive with said granular aluminum hydrate, or (K) siloxy and at least one of amine and thiol groups reactive with said granular aluminum hydrate.

2. The rubber composition of claim 1 which further contains a coupling agent comprised of a bis(3-triethoxysilylpropyl) polysulfide having an average of from about 2 to about 4 connecting sulfur atoms in its polysulfidic bridge.

3. The rubber composition of claim 1 wherein said functional groups are comprised of siloxy and at least one of amine and thiol groups.

4. A tire having a rubber component comprised of the rubber composition of claim 1.

5. A tire having a rubber component comprised of the rubber composition of claim 2.

6. A tire having a rubber component comprised of the rubber composition of claim 3.

7. The rubber composition of claim 1 wherein which contains from 40 to about 100 phr of the precipitated silica and from about 1 to about 70 phr of the rubber reinforcing carbon black.

8. The rubber composition of claim 1 wherein said functionalized diene-based elastomer contains the functional group(s) comprised of:
- (A) combination of amine and siloxy functional groups reactive with said granular aluminum hydrate, or
- (B) combination of thiol and siloxy functional groups reactive with said granular aluminum hydrate, or
- (C) combination of imine and siloxy functional groups reactive with said granular aluminum hydrate.

9. The rubber composition of claim 2 wherein said functionalized diene-based elastomer contains the functional group(s) comprised of:
- (A) combination of amine and siloxy functional groups reactive with said granular aluminum hydrate, or
- (B) combination of thiol and siloxy functional groups reactive with said granular aluminum hydrate, or
- (C) combination of imine and siloxy functional groups reactive with said granular aluminum hydrate.

10. A tire having a rubber component comprised of the rubber composition of claim 7.

11. A tire having a rubber component comprised of the rubber composition of claim 8.

12. A tire having a rubber component comprised of the rubber composition of claim 9.

* * * * *